United States Patent
Hunter, Jr. et al.

(10) Patent No.: US 11,488,728 B2
(45) Date of Patent: Nov. 1, 2022

(54) CONFINEMENT WALLS FOR INERTIAL CONFINEMENT FUSION CHAMBERS

(71) Applicants: Robert O. Hunter, Jr., Aspen, CO (US); Eric W. Cornell, Colorado Springs, CO (US)

(72) Inventors: Robert O. Hunter, Jr., Aspen, CO (US); Eric W. Cornell, Colorado Springs, CO (US)

(73) Assignee: INNOVEN ENERGY LLC, Colorado Springs, CO (US)

( * ) Notice: Subject to any disclaimer, the term of this patent is extended or adjusted under 35 U.S.C. 154(b) by 0 days.

(21) Appl. No.: 17/179,221

(22) Filed: Feb. 18, 2021

(65) Prior Publication Data
US 2022/0028568 A1 Jan. 27, 2022

Related U.S. Application Data

(60) Provisional application No. 62/978,117, filed on Feb. 18, 2020.

(51) Int. Cl.
| | |
|---|---|
| *G21B 1/19* | (2006.01) |
| *G21B 1/03* | (2006.01) |
| *G21B 1/13* | (2006.01) |
| *G21B 1/17* | (2006.01) |

(52) U.S. Cl.
CPC ............ *G21B 1/19* (2013.01); *G21B 1/03* (2013.01); *G21B 1/13* (2013.01); *G21B 1/17* (2013.01)

(58) Field of Classification Search
CPC ... G21B 1/13; G21B 1/03; G21B 1/17; G21B 1/19; G21B 1/23

USPC .................. 376/102–104, 151, 152
See application file for complete search history.

(56) References Cited

U.S. PATENT DOCUMENTS

| | | | | |
|---|---|---|---|---|
| 3,346,458 A | * | 10/1967 | Schmidt | H05H 1/00 376/151 |
| 2014/0044226 A1 | * | 2/2014 | Campbell | G21B 1/23 376/103 |
| 2016/0155518 A1 | * | 6/2016 | Mizuno | G21B 1/19 376/151 |
| 2017/0213603 A1 | * | 7/2017 | Galloway | G21B 1/19 |
| 2017/0229193 A1 | * | 8/2017 | Galloway | G21B 1/03 |

FOREIGN PATENT DOCUMENTS

| | | | | |
|---|---|---|---|---|
| DE | 202014103381 U1 | * | 10/2014 | G21B 1/05 |
| WO | WO-2011146113 A1 | * | 11/2011 | G21B 1/03 |

* cited by examiner

*Primary Examiner* — Darlene M Ritchie

(57) ABSTRACT

A compact, simpler, more economical ICF target chamber and reactor design that maintains a low internal pressure, sub-atmospheric, and very small neutron flux on any pressure bearing vessel or steam generating mechanism. The present invention reduces radiant target emission towards the nearest wall of the hohlraum wall and/or sleeve material so that the radiation from target burn exits the end of the hohlraum through a wall material sufficiently thick to contain the target drive radiation, but becomes transparent to the target emitted radiation. The compact converter contains the energy released by the ICF target and converts it into usable heat to create steam. It also converts the excess neutrons, from the ICF target, into tritium. This is then collected with the unburnt fuel tritium.

2 Claims, 1 Drawing Sheet

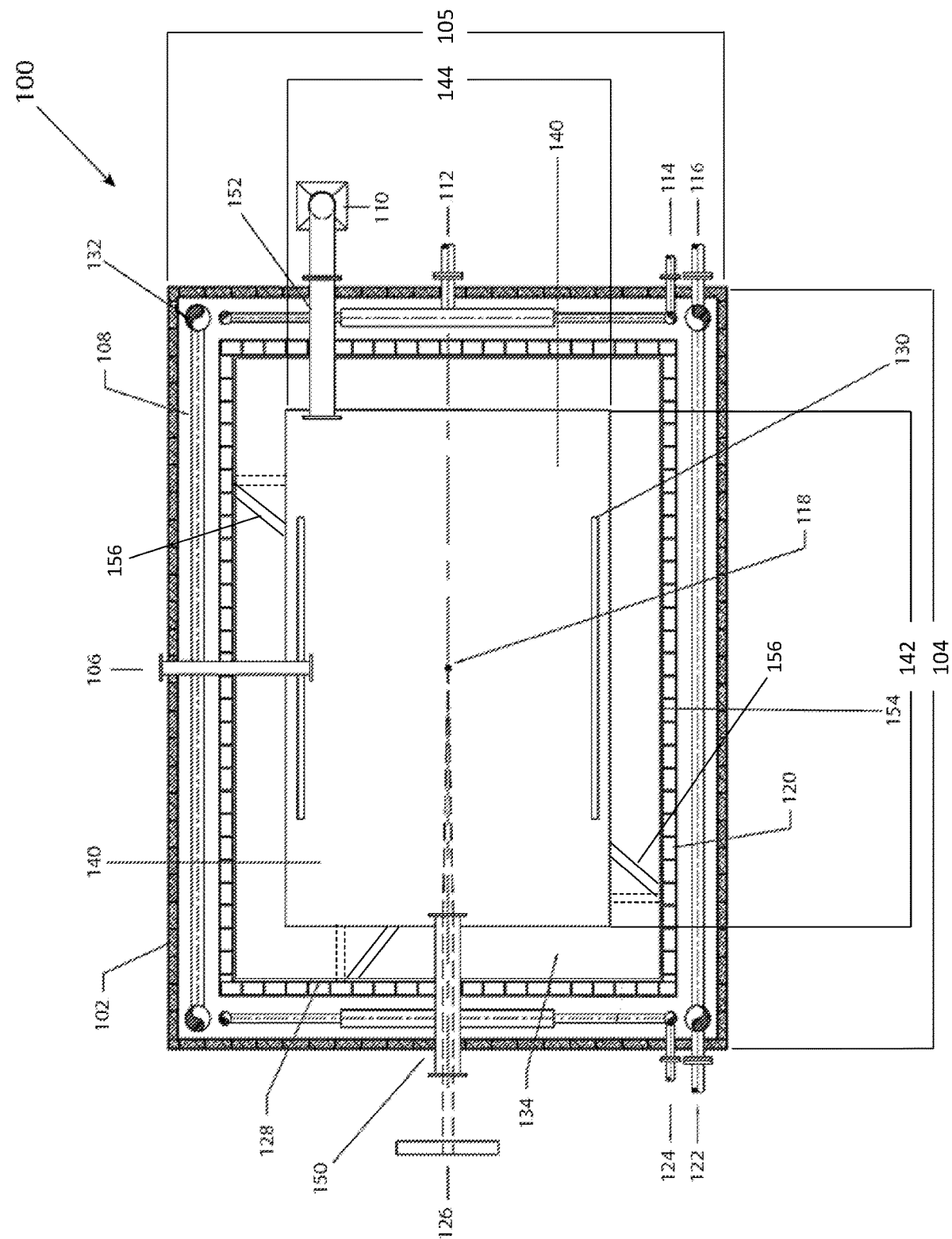

CONFINEMENT WALLS FOR INERTIAL CONFINEMENT FUSION CHAMBERS

CROSS-REFERENCE TO RELATED APPLICATIONS

This application claims the benefit of U.S. Provisional Application No. 62/978,117 filed on Feb. 18, 2020, which is incorporated herein by reference.

BACKGROUND

Nuclear fusion refers to a type of reaction that occurs when certain atomic nuclei collide. In most fusion reactions, two light nuclei combine, producing heavier nuclei and/or nuclear particles. A small amount of mass is lost in this process. According to the formula of mass-energy equivalence $E=mc^2$, this mass is converted to energy, eventually settling in the form of thermal energy (heat) in the material surrounding the reacting particles.

These reactions occur when such atomic nuclei have been heated to a high temperature, forming a plasma. The temperature at which a plasma undergoes fusion varies depending on the type of material. Two challenges in using nuclear fusion to produce power are referred to as ignition and confinement. Ignition occurs when a plasma of fusion fuel is heated to a high enough temperature that the fuel becomes hot enough to heat itself through self-heating. That is, ignition occurs when the energy released from the fusion reaction exceeds the energy lost through other mechanisms, such as Bremsstrahlung radiation and hydrodynamic expansion. The temperature at which this occurs is called the ignition temperature. The reaction that requires the lowest temperature is that between deuterium (D) and tritium (T), two hydrogen isotopes. As other fusion reactions require yet-higher temperatures, most nuclear fusion power concepts envision the use of D-T fuel. For D-T fuel, the ignition temperature can range from 2-10 keV depending on the physical properties of the plasma. After ignition, self-heating of the fuel can cause the fuel to rapidly reach ion temperatures of about 100 keV or more. This is often referred to as runaway burn.

Once fuel has been ignited, confinement refers to the challenge of keeping the fuel from expanding (thus cooling and ceasing to burn) long enough for it to produce the desired amount of energy, at least as much energy as was required to ignite it and keep it confined, and hopefully significantly more. While heating the fuel to ignition is simply a matter of delivering energy to it, confinement is more challenging. There is no way to confine a plasma heated to ignition temperature or beyond with a simple mechanical system. Any solid substance, such as a metal wall of a container, that comes into contact with a fusion plasma would either become instantly vaporized, or drastically cool the plasma and stop the burn itself, or both.

One approach to controlling nuclear fusion for practical power production is called Inertial Confinement Fusion. ICF takes advantage of how the characteristics of fusion burn change with fuel size and density. At ordinary densities and practicable sizes, a D-T plasma heated to ignition temperature will disassemble (expand and stop burning) before producing anywhere near the energy required to originally heat it. However, as the density of a given amount of fuel is increased, the rate at which the fuel will burn increases faster than the rate at which it will expand. This means that, if the fuel can be compressed sufficiently before heating it, the fuel's own resistance to motion (inertia) will keep it from expanding long enough to yield significant energy. This approach is referred to as Inertial Confinement Fusion (ICF). For an excellent survey of the field, see: Stefano Atzeni and Jurgen Meyer-Ter-Vehn. The Physics of Inertial Fusion. Oxford: Oxford University Press, 2007.

In an ICF system, a "drive" mechanism such as an array of laser or ion beams is used to deliver energy to a small, usually spherical "target" containing fusion fuel. The target is designed to use this energy to compress the fuel to high densities and then ignite it. The fuel burns, producing energy in the form of neutrons, radiation, and an expanding debris field. In an ICF reactor, various mechanisms can convert this energy into heat, which can then be used in a standard thermal cycle to do useful work.

Conventional ICF reactor concepts have total target yields of around 500 MJ, and gains of several hundred. Gain refers to the ratio of the total yield and the input driver energy. An average target "shot" producing 500 MJ releases the same energy as 10 fully-loaded 18-wheelers traveling over 100 mph, or approximately the same energy as 125 kg of high explosive. The chamber surrounding the target must be designed to safely contain repeated shots at this energy without being damaged. R. L. Engelstad and E. G. Lovell, "Parametric Lifetime Analysis of Cylindrical Chambers for the Target Development Facility," Report UWFDM-656, Fusion Technology Institute, University of Wisconsin, Madison, Wis., 1985 discusses containment vessels having a target yield up to about 800 MJ.

In a typical ICF target, approximately 70-75% of the energy is emitted as high-energy ("fast") neutrons produced by D-T fusion reactions directly, 6-22% as x-ray radiation produced by the high temperatures in the target during fusion burn, and 8-19% as kinetic energy in the debris. The exact distribution depends on the target configuration. Each of these components can cause damage to the target chamber in several ways. See S. Atzeni and M. L. Ciampi, "Burn Performance of Fast Ignited, Tritium-Poor ICF Fuels," Nuclear Fusion, Vol. 27, No. 12, pp. 1665-1677, 1997

Neutrons damage structural materials by producing dislocations in the metal lattice, and transmuting atoms in the reactor wall to different elements. Both damage mechanisms compromise the material's structural integrity, causing swelling, embrittlement, changes in the ductile-brittle transition temperature (DBTT), and introducing impurities in the material's chemical composition. X-ray radiation damages chamber wall material through heating. Excessive radiation flux can heat the wall material beyond its melting point or vaporize and ablate off the inner surface of the wall.

The debris produced by the target can produce shocks in the chamber when it impacts the wall material. Shocks propagating through the chamber can producing spalling between material interfaces in the chamber and disrupt the structural integrity of the chamber materials themselves. Once it has expanded to fill the entire chamber, the hot, low-density gas in the debris field will also exert a static pressure, which the chamber must be able to contain. The force of material ablating off the wall surface due to x-ray heating may also drive shocks that can produce spalling and material damage.

In addition to remaining intact under these harsh conditions, an ICF reactor chamber must also perform additional duties. It must evacuate or otherwise handle the debris produced by the targets being fired at the rate of several each second, including recovering the unburnt tritium present in the debris. It must provide a mechanism for introducing new targets to the chamber at the rate of several per second, in a manner that allows them to be precisely aligned with the drive mechanism. Additionally, as tritium is a radioactive material that is very scarce in nature and is prohibitively expensive to produce artificially for economic power generation, ICF reactors must contain tritium-breeding materials and recovery systems that use neutrons emitted by the target to produce enough tritium to replace that which is burnt with each shot. As most of the energy output of conventional ICF targets is carried in neutrons, these tritium-breeding "blankets" must also be able to serve as ≈1 GW energy recovery and cooling system. Many ICF reactor concepts involve the use of flowing liquid lithium metal as a tritium breeding material and coolant. All of this must be performed while maintaining a sufficient vacuum in the chamber itself to allow the drive beams to deliver energy to the target without excessive losses. Finally, the materials used in all of these components must be chosen so as to remain intact under a high neutron flux and minimize the amount of neutron-induced radioactivity present in the structure when it is decommissioned.

Various schemes have been proposed to produce an ICF power plant reactor which can operate under these conditions. An overview of several reactor concepts can be found in: Gunther Kessler, Gerald L. Kulcinksi, and Robert R. Peterson. "ICF Reactors—Conceptual Design Studies," in *Nuclear Fusion by Inertial Confinement: A Comprehensive Treatise*, edited by Guillermo Velarde, Yigal Ronen, and Jose M. Martinez-Val. Boca Raton, Fla.: CRC Press, 1993. Chap. 25. ISBN: 0-8493-6926-6. In some target chambers, wall material is vaporized and re-condenses before the next shot. Other designs involve liquid metal flows or jets which surround the target and absorb the energy before it reaches the wall. These so-called "wetted wall" designs can in general handle a higher energy flux and operate with a lower exposed surface area, as well as to soften (shift to lower energy) the neutron spectrum and decrease the neutron flux on the first wall. The use of magnetic fields to shield the walls has also been proposed.

The Cascade reactor concept, consists of an approximately 5 m diameter conical reactor chamber, rotating at 50 rpm, utilizing a tritium breeding layer of lithium aluminate pellets that are held to the reactor wall by centripetal force. Targets are inserted into the chamber at 5 Hz and burnt, yielding 300 MJ each. The pellets are fed into the reactor by gravity through an insertion port near the axis of rotation and migrate along the conical reactor wall. Energy recovery occurs through pellets being flung from the outermost part of the rotating chamber into a hopper, which contains heat exchangers to extract the thermal energy and equipment to extract tritium bred in the lithium aluminate pellets.

Conventional ICF targets produce an output that is mostly uniform in angular distribution, and so conventional ICF target chambers are designed to contain isotropic output. This means that they are all roughly spherical in shape, or at least not significantly larger in one dimension than another.

All of these concepts are theoretical in nature, as the only actual ICF systems constructed have been experimental research facilities such as NIF, which do not attempt to produce useful amounts of power, achieve high repetition rates, or breed tritium. Designing, building and operating a safe, practical, reliable ICF power plant utilizing these concepts will require a long period of costly engineering effort. The neutron fluxes and neutron energies produced by ICF targets are higher than those produced in nuclear fission reactors, and thus outside the range in which significant materials engineering expertise exists. In Michael Moyer, "Fusion's False Dawn". In: Scientific American (2010), Mohamed Abdou, director of the Fusion Science and Technology Center at UCLA, estimates that if work were to begin immediately, it would take 30-75 years of effort on the tritium breeding blanket alone before the issues are understood well enough to begin construction on an actual power plant.

Simpler, more economical ICF target chamber and reactor designs that are compact would be advantageous. The following detailed description together with the accompanying drawings will provide a better understanding of the nature and advantages of the present invention.

SUMMARY

Inertial Confinement Fusion (ICF) reactor chambers can be designed to contain an ICF target being imploded and capture the resulting energy output from the reaction in the forms of neutrons, radiation, and/or debris. The present invention is directed towards a compact converter that tailors the debris. A converter contains the energy released by the ICF target and converts it into usable heat to create steam. It also converts the excess neutrons, from the ICF target, into tritium. This is then collected with the unburnt fuel tritium.

Embodiments of the invention are directed toward reducing radiant target emission towards the nearest wall of the hohlraum wall and/or sleeve material. The radiation from target burn will exit the ends of a cylindrical hohlraum through a wall material sufficiently thick to contain the target drive radiation but becomes transparent to the target emitted radiation. By directing the radiation output of the ICF target yield down the long axis of the converter, it can be absorbed by heat-exchanging pipes filled with gas.

Until now there has never been the ability or desire to create an economical and commercially available compact ICF target chamber and reactor design as described in the specific embodiments and configurations below. A simpler, more economical and compact ICF target chamber and reactor design has advantageously allowed for superior and unexpected results over the existing designs for various reasons. Configuring a design to keep energy from reaching the near walls in the radial direction and strategically placing holes within the energy reflector/absorber walls to allow debris to travel away from the ICF target and transfer energy laterally within the energy reflector/absorber wall as opposed to the surface would be advantageous.

BRIEF DESCRIPTION OF THE DRAWINGS

FIG. 1 shows a schematic design of the present invention.

SPECIFICATION

Inertial Confinement Fusion reactor chambers can be designed to contain an ICF target being imploded and capture the resulting energy output from the reaction in the forms of neutrons, radiation, and/or debris. Such chambers can generally include a combination of neutron moderating, neutron absorbing, neutron shielding layers, radiation capturing layers, sacrificial layers, shock absorbers, tritium breeding layers, tritium breeders, coolant systems, injection nozzles, inert gas injection nozzles, sputterers, sacrificial coating injection nozzles, beam channels, target supporting mechanism, and/or purge ports, among others. Generally speaking, neutron moderating material can be constructed from graphite and may be naturally or artificially doped, combined, allowed, and/or mixed with neutron absorbing material and/or have a thickness of one or more neutron mean free path lengths (e.g., 0.3-1.0 m). Neutron absorbing material may include boron, cadmium, lithium, etc. Radiation tiles or layers can be disposed throughout the chamber to absorb radiation from the reaction.

Such cylindrical chambers can be used with both directional and omni-directional targets. For instance, for use with directional targets where neutrons are not directed and radiations and debris are directed along the longitudinal length of the cylinder, a chamber can have neutron moderating and/or absorbing material concentrated near the center of the cylinder, and radiation and debris collecting material can be concentrated in the outer sections of the cylindrical chamber. Various other specific embodiments and configurations are described.

The term "approximately" includes a given value plus/minus 15%. For example, the phrase "approximately 10 units" is intended to encompass a range of 8.5 units to 11.5 units.

The term "neutron" refers to a subatomic particle with no electrical charge. Their lack of a charge means that free neutrons generally have a greater free range in matter than other particles.

The term "proton" refers to a subatomic particle with a positive electrical charge.

The term "electron" refers to a subatomic particle with a negative electrical charge, exactly opposite to that of a proton and having less mass than a proton and a neutron.

The term "atom" refers to a particle of matter, composed of a nucleus of tightly bound protons and neutrons, with an electron shell. Each element has a specific number of protons. Atoms under ordinary conditions have the same number of electrons as protons, so that their charges cancel.

The term "isotope" refers to atoms of the same element that have the same number of protons, but a different number of neutrons. Isotopes of an element are generally identical chemically but have different probabilities of undergoing nuclear reactions. The term "ion" refers to a charged particle, such as a proton or a free nucleus.

The term "plasma" refers to the so-called fourth state of matter, beyond solid, liquid, and gas. Matter is typically in a plasma state when the material has been heated enough to separate electrons from their atomic nuclei.

The term "Bremsstrahlung radiation" refers to radiation produced by interactions between electrons and ions in a plasma. One of the many processes that can cool a plasma is energy loss due to Bremsstrahlung radiation.

The term "Z" refers to the atomic number of an element, i.e., the number of protons in the nucleus. The term "A" refers to the atomic mass number of an element, i.e., the number of protons and neutrons in the nucleus. At the pressures and temperatures involved in imploding and burning ICF targets, specific material properties that one observes in everyday life (hardness, strength, room-temperature, thermal conductivity, etc.) may be irrelevant, and the hydrodynamic behavior of a material can depend most strongly on the material's average atomic number, atomic mass number, and solid density.

As such, in discussing material requirements in ICF targets, it is convenient to discuss classes of material. For the purposes of the following discussion, the term "low-Z" will refer to materials with an atomic number of 1-5 (hydrogen to boron); the term "medium-Z" will refer to materials with an atomic number of 6-47 (carbon to silver); and the term "high-Z" will refer to materials with an atomic number greater than 48 (cadmium and above). Unless otherwise stated, the use of these terms to describe a class of material for a specific function is intended only to suggest that this class of material may be particularly advantageous for that function, and not (for instance) that a "high-Z" material could not be substituted where a "medium-Z" material is suggested, or vice-versa. Specific material choice is still important, where indicated, as different isotopes of the same element undergo completely different nuclear reactions, and different elements may have different radiation opacities for specific frequencies. The differing solid densities of materials with similar Z is also important for certain design criteria.

The term "runaway burn" refers to a fusion reaction that heats itself and reaches a very high temperature. Because the D-T reaction rate increases with temperature, peaking at 67 keV, a D-T plasma heated to ignition temperatures may rapidly self-heat and reach extremely high temperatures, approximately 100 keV, or higher.

For targets burning advanced fuels such as D-D, but particularly D-$^3$He and p-$^{11}$B, the output may be substantially larger in radiation and less in neutrons and debris. The radiation output may be at 1 KeV in a blackbody spectrum (if the interior structure of target bleached, would look like Bremsstrahlung). However, if the lower energy part of the spectrum is blocked, then the photon energy would be, say, all above 2 KeV. The spectrally averaged deposition rate is then in the range of 10 cm$^2$/g for Beryllium. Obviously, the hotter the target, the better. By 10 KeV, the absorption value would be approaching 0.1 cm$^2$/g leading to 3 m$^2$ per side. In such a case, a small radius (1 meter) cylinder might be sufficient. This class of target and converter has the potential for very compact converters.

For our purposes, let us assume the ICF target is filled with deuterium and tritium (D-T) as the entire fuel source. However various other fuel sources are possible such as but not limited to the following: D-$^3$He, D-D, and p-$^{11}$B. This implies a small tritium breeding ratio (1.01~1.1) in the large energy section will be more than adequate to generate substantial amounts of tritium relative to the consumption by targets. Tritium breeding ratio is the amount of tritium, including the unburnt tritium and tritium bred in the converter, after full yield, over the initial tritium in the target. For pure D-T targets with a large fraction of the energy appearing as 14 MeV neutrons and a total tritium breeding ratio of about 1-10% more than the tritium burned, a converter with some neutron multiplication is indicated.

FIG. 1 shows an embodiment of converter 100. Target chamber 140 is located inside insulation wall 102 and directly surrounded by energy reflector/absorber walls 134. Outer surface of insulation wall 102 may be composed of a mild steel while inner surface of insulation wall 102 may be composed of a stainless steel having an outer dimension with an approximate length 104 of 29 feet 1⅛ inches and approximate width 105 of 22 feet 4¼ inches. Target assembly 118 is centrally positioned inside of target chamber 140 via target insertion channel 106. Target chamber 140 has an approximate length 142 of 19 feet 8¼ inches and approximate width 144 of 12 feet 11 5/16 inches. This configuration is sized to keep radiation 126 from the near walls in the radial direction. Target chamber 140 is sealed off and any unwanted molecules are removed by vacuum pump 110 through plumbing tubes 152. Baffle 120 surrounds energy reflector/absorber walls 134. Plate 128 may be composed of lithium, liner 154 may be composed of tungsten and are located on inner surface of baffle 120. Energy reflector/absorber walls 134, plate 128, liner 154 and baffle 120 are assembled sequentially as shown in FIG. 1. Baffle 120 allows for heat to exit target chamber 140 and enter pipes 108. Pipes 108 are positioned between insulation wall 102 and baffle 120 and allow fluids to flow in and out of various inlets/outlets 112, 114, 116, 122 and 124. This compact configuration is appropriately sized such that the radiation interacting with target assembly 118 is prevented or limited from reaching energy reflector/absorber walls 134 in the radial direction of the ICF target.

Pipes 108 may have steam, water in the gas phase, flowing through them, into and out of the insulation wall 102, through many inlets/outlets 112, 114, 116, 122 and 124. Alternatively, instead of steam, a heavy water ($D_2O$) may be used to fill pipes 108 in order to absorb radiation 126. Cooling tube manifolds 132 may be located at the perpendicular intersections of pipes 108.

Laser light 126 enters through vacuum transition section 150 before reaching target assembly 118, located in target chamber 140. Target assembly is defined as the ICF target and hohlraum; for example, a cylindrical hohlraum may be used. Laser light 126 is converted to x-ray radiation (i.e., target drive radiation) upon interaction with target assembly 118. After ignition, radiation from target burn (i.e., target emitted radiation) exits the end of cylindrical hohlraum through a wall sufficiently thick to contain the target drive radiation but becomes transparent to the target emitted radiation.

Target debris may hit energy reflector/absorber walls 134 which prevents any further expansion before it can impinge on the pressure containment wall or baffle 120. Energy reflector/absorber walls 134 are made up of any one of a variety of materials, such as graphite, beryllium, or other materials as listed in Table 1, not inclusive. Energy reflector/absorber walls 134 serve the primary functions of both converting the 14 MeV neutrons to thermal energy and low energy neutrons and keeping neutrons from the external structural materials. Optionally, an absorbing material may be added to the back of energy reflector/absorber walls 134. Lithium plate 128 may also be placed in energy reflector/absorber walls 134 to absorb neutrons. The lithium may then breed tritium which can be recovered and used in subsequent shots. Energy reflector/absorber walls 134 reflect and thermalize much of the incident neutron flux, at least 80%. The incident neutron flux is eventually captured graphite and then down-scattered and captured by the Lithium-6 before it is converted to tritium. The addition of beryllium plates 130 may be used as neutron multipliers in converter 100.

drilled through the energy reflector/absorber walls 134. Holes 156 may range from approximately 1-10 mm in diameter and extend through energy reflector/absorber walls 134 at an angle or straight through. Holes 156 may be filled with a low Z material, or layers of material. FIG. 1 illustrates only a few holes 156 at both an angle and perpendicular to the lateral dimension of the energy reflector/absorber wall 134, but it is understood that one could arrange a plurality of holes 156 at either an angle, perpendicular, or a combination of both, throughout energy reflector/absorber walls 134. Ideally, if one could control and arrange the debris from the target to be ejected directionally, then holes 156 would be placed in-line with the debris field. A plurality of holes 156 may be arranged throughout the energy reflector/absorber walls 134 such that there is about a 1 to 1 ratio of holes and no-holes covering the surface area. As debris travels down holes 156, energy will be transferred laterally and absorbed uniformly deep within energy reflector/absorber walls 134 instead of directly at the surface. The debris will then become the same temperature as the material of the energy reflector/absorber walls 134. Advantageously, this will maintain a sub-atmospheric pressure on the outside wall.

In general, the volumetric distribution of heat in the converter materials resulting from the target energy release is desirable and leads to various converter configurations, depending on the target characteristics.

After ICF target implodes, igniting the fuel, target assembly releases $3.8 \times 10^{10}$ joules of energy in the form of radiation, debris, and neutrons. Neutrons released by the target are then moderated in thick graphite blocks. The moderated neutrons are reflected as lower energy neutrons and are then captured by lithium in energy reflector/absorber walls 134 of the converter, producing tritium and releasing another $10^{10}$ joules of energy. The compact converter uses the heat produced by the energy released to heat steam which can then be used to produce electricity. The converter is evacuated after a target shot and the unburnt and newly produced tritium are separated from the waste to fill subsequent targets. This process is repeated at a low repetition rate (one pulse every 50-100 seconds). By closing the recovery cycle and adding tritium to the target onsite, the tritium inventory may be kept low.

TABLE 1

Common Heat Sink Materials

| Material | Heat Capacity (J/g °K) @ 1000° K | Mass (g) for $10^{11}$ J $\Delta T = 100° K$ | Mass (tons for $10^{11}$ J) $\Delta T = 100° K$ |
| --- | --- | --- | --- |
| Beryllium (Be) | 3.02 | $3.3 \times 10^8$ | 330 |
| Graphite (C) | 1.79 | $5.6 \times 10^8$ | 560 |
| Aluminum (Al) | 1.08 | $9.25 \times 10^8$ | 925 |
| Iron (Fe) | 0.75 | $1.33 \times 10^9$ | 1330 |
| Copper (Cu) | 0.457 | $2.2 \times 10^9$ | 2200 |
| Water ($H_2O$) | 4.18 | $2.4 \times 10^8$ | 240 |

Advantageously, this configuration allows for a very compact target debris field and therefore a compact ICF target chamber and reactor design. This compact configuration will further allow for reduced complexity in the tritium collection. The radiation leaving target assembly will be absorbed in energy reflector/absorber walls 134, which are approximately 0.5-1.0 m in depth. In order to achieve a uniform deposition in the material and to maintain a sub-atmospheric pressure on the outside wall, holes 156 may be

TABLE 2

| System Design Point - 300 MWe | |
| --- | --- |
| Attribute | Value |
| Yield Per Pulse | $3.8 \times 10^{10}$ J/pulse (target) + $1.0 \times 10^{10}$ ** J/pulse (lithium) |
| Pulse Repetition Rate | 60 seconds |
| Electricity Grid Output | 300 MWe electric |

TABLE 2-continued

System Design Point - 300 MWe

| Attribute | Value |
|---|---|
| Electricity to Laser, Balance of Plant | 20 MWe |
| Tritium Breeding Ratio | 1.08*** |
| Steam Outlet Temperature | 600° C. |
| Thermal Efficiency | 0.4 |
| Volume Averaged Single Pulse Temperature Rise for 270 Ton Converter | 100° C. |
| Total Target Waste for One Year | 4.1 tons of low-level waste |

** The $Li^6$ capture energy yields 27.6% of the D-T release (17.59 MeV)
***An excess of ~10% may be given by the addition of beryllium plates used as neutron multipliers in the converter.

The three major components for target output are outlined below in Table 3: neutron fluence, thermal radiation fluence, and impulse load. The critical value is given for the radius needed for a graphite (similar to beryllium in scaled values) surface to survive. For our purposes, let us assume the converter has a 2-meter radius, the ICF target is filled with deuterium and tritium (D-T) as the entire fuel source and a $3\times10^{10}$ joule target yield.

TABLE 3

CRITICAL RADIUS FOR THREE MAJOR SOURCES OF ENERGY RELEASE* (GRAPHITE)

| | Neutron Fluence | Thermal Radiation Fluence | Material Impulse Load |
|---|---|---|---|
| Energy Released | $2 \times 10^{10}$ J | $6 \times 10^9$ J | $1.5 \times 10^9$ J |
| Damage Criterion | $\Phi nc = 5 \times 10^5$ J/cm$^3$ | $\Phi \gamma c = 100\, T_k^{3/2}$ J/cm$^2$ | $\Phi ci$ = 2 Kilotaps ($2 \times 10^3$ dyne-sec/cm$^2$) |
| Characteristics | 14 MeV energy | $T_k$ ~1 KeV | 20 g expanding at $4 \times 10^7$ cm/sec |
| Critical Radius | 0.56 m | 21.8 m | 5.5 m |

*Pure D-T target with prompt energy release of $3 \times 10^{10}$ Joules.

Neutron fluence is defined as the number of neutrons per area. At a high enough temperature, such as approximately $10^5$ joule/cm$^3$, graphite will self-anneal. The vaporization energy in graphite for an approximately ½-meter penetration length, (~10 cm for one 90° scattering), uses 1/10 for peak deposition to average. The critical radius for neutron fluence is calculated below.

$$(10^4 \, j/cm^3)(50 \, cm) = 5 \times 10^5 \, joules/cm^2 = \Phi_{nc}$$

Total $3 \times 10^{10}$ joule yield with ~ $2 \times 10^{10}$ joules in neutrons, $(4\pi r_{cn}^2)(\Phi_{nc}) = 2 \times 10^{10}$ joules, where $r_{cn}$ = critical radius for neutrons $$r_{cn}^2 = \frac{2 \times 10^{10} \, J}{4\pi (5 \times 10^5 \, J/cm^2)} = 3.18 \times 10^3 \, cm^2$$

$$r_{cn} = 56 \, cm$$

Thermal radiation fluence is defined as the amount of energy per area. The proton fluence is calculated below.

$\Phi_{rc} = 100 \, T_k^{3/2}$ joules/cm$^2$ due to large absorption of low energy photons. $T_k$ = 1 KeV typical, and a radiation fraction of 0.2

$(\phi rc)(4\pi r_{cp}^2) = (.2) 3 \times 10^{10}$ joules = $6 \times 10^9$ joules $$r_{cp}^2 = \frac{6 \times 10^9 \, joules}{4\pi 10^2 \, joules/cm^2} = 4.78 \times 10^6 \, cm^2$$

$$r_{cp} = 2.18 \times 10^3 \, cm$$

Material impulse load is defined as the amount of pressure per area. Assuming a total target mass of 20 grams is at $3\times10^{10}$ joules and 1-2 kilotaps (1 tap=1 dyne-sec/cm$^2$), the impulse load is calculated as follows.

If debris energy is 5% of the total yield, $$E_D = \frac{1}{2}(20)(v_D^2) = 1.5 \times 10^9 \, joules \times \frac{10^7 \, ergs}{joule} = 1.5 \times 10^{16} \, ergs$$

$$v_D^2 = \frac{3 \times 10^{16}}{20}, \, v_D = 3.9 \times 10^7 \, cm/sec$$

Total impulse available:

$I_{TOT}$=(20 g)($3.9\times10^7$ cm/sec)=$7.7\times10^9$ dyne-sec $(\phi_{CI})(4\pi r_{cI}^2)$=$7.7\times10^9$ dyne-sec/cm$^2$ using $\phi_{CI}$ as $2\times10^3$ dyne-sec/cm$^2$ $r_{cI}^2$=$3.06\times10^5$ cm$^2$, and $r_{cI}$=$5.54\times10^2$ cm Thus, we see that the photon fluence is the most critical threat. In the target, using hohlraum end caps as high pass filters and cylindrical walls as reflectors (no thermal wave through walls, including effects of neutron heating) this limitation can be removed. We postulate the reduction of the critical radius for impulse, $r_{cI}$, by careful design of the target to minimize the distance to the nearest wall (largely through tailoring for debris not expanding uniform). Also, the plate or converter design in terms of damage threshold, $r_{cI}$, may be utilized to reduce the critical radius down to 2 meters. Also, the large commercial targets may be tailored to reduce the energy fraction left in debris.

The viewpoint that ICF is unlikely to be economically competitive follows from the historic development paths taken for the targets, lasers and overall systems. Refer to page 67 of Gunther Kessler, Gerald L. Kulcinksi, and Robert R. Peterson. "ICF Reactors—Conceptual Design Studies," in *Nuclear Fusion by Inertial Confinement: A Comprehensive Treatise* which displays an early (~1995) group of reactor designs. These usually involve a high repetition rate driver (1-10 pulses per second) as well as a breeding blanket to increase the target neutron number output, produce tritium, and manage the conversion of neutron kinetic energy to thermal energy, and results in complicated fluid and mechanical arrangements. Also, certain designs have a high flux of 14 MeV neutrons on structural materials.

The safety considerations are substantially lessened compared to a fission reactor. A loss of cooling accident would not involve decay product induced temperature rise, as in certain fission reactors. By not energizing a subsequent laser pulse post-shot energy would not contribute significantly to the temperature of the structure. Standard design precautions should be adequate to minimize chemical events (fires, etc.). Release of nuclear materials such as tritium compounds at even a low level are of major concern. The nuclear reactor industry has an extraordinary experience and material properties knowledge base, complete with an excellent overall safety record. The design, construction and handling of materials involved here are well within its capabilities.

Also, there will be some activation of the graphite; thus, control of impurities is important. The target components see an intense neutron flux. Careful selection of target materials will minimize activation. One high-z material was looked at on an initial basis and its activation characteristics indicate onside storage for less than 20 years will result in a low-level activity that permits shipment and permanent disposable under existing industrial and medical standards. There is no need for a high level, long-lived waste disposal. The total mass and activity are all well below the fission reactor experience. For core activation by the 14 MeV neutrons, the issue is lifetime. If the core lasts a nominal 30 years, the cost of core disposal as intermediate level waste is not a dominating economic cost. There is a tradeoff between the neutron spectrum and core behavior.

All of these concepts are theoretical in nature, as the only actual ICF systems constructed have been experimental research facilities such as NIF, which do not attempt to produce useful amounts of power, achieve high repetition rates, or breed tritium. Actually designing, building and operating a safe, practical, reliable ICF power plant utilizing these concepts will require a long period of costly engineering effort. The neutron fluxes and neutron energies produced by ICF targets are higher than those produced in nuclear fission reactors, and thus outside the range in which significant materials engineering expertise exists.

Additionally, the set of embodiments discussed in this application is intended to be exemplary only, and not an exhaustive list of all possible variants of the invention. Certain features discussed as part of separate embodiments may be combined into a single embodiment. Additionally, embodiments may make use of various features known in the art but not specified explicitly in this application.

It should be noted that embodiments can be scaled-up and scaled-down in size, and relative proportions of components within embodiments can be changed as well. The range of values of any parameter (e.g., size, thickness, density, mass, composition, etc.) of any component of an embodiment of this invention, or of entire embodiments, spanned by the exemplary embodiments in this application should not be construed as a limit on the maximum or minimum value of that parameter for other embodiments, unless specifically described as such.

While advantages and characteristics of certain embodiments are mentioned, this should not be interpreted as a requirement that all embodiments display these advantages or characteristics. The previous description provides embodiments only, and is not intended to limit the scope, applicability, or configuration of the disclosure. Rather, the previous description of the embodiments will provide those skilled in the art with an enabling description for implementing one or more embodiments. It is understood that various changes may be made in the function and arrangement of elements without departing from the spirit and scope of the invention. Several embodiments were described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the previous description to provide a thorough understanding of the embodiments. However, it will be understood by one of ordinary skill in the art that the embodiments may be practiced without these specific details. While detailed descriptions of one or more embodiments have been given above, various alternatives, modifications, and equivalents will be apparent to those skilled in the art without varying from the spirit of the invention. Moreover, except where clearly inappropriate or otherwise expressly noted it should be assumed that the features, devices and/or components of different embodiments may be substituted and/or combined. Thus, the above description should not be taken as limiting the scope of the invention.

The invention claimed is:

1. A confinement chamber for Inertial Confinement Fusion (ICF), the chamber comprising:
   a target chamber to receive an ICF target assembly positioned to receive x-ray radiation;
   a wall directly surrounding the target chamber comprising a plurality of holes
   the plurality of holes are positioned at a combination of different angles within the wall, penetrate through the wall, and radiate outward from the target chamber, wherein the plurality of holes are arranged throughout the wall such that there is a 1 to 1 ratio of holes to no-holes, and wherein the plurality of holes are filled with a low-Z material;
   a pressure containment wall surrounding the wall, wherein the inner surface of the pressure containment wall is lined with an absorbing material, such as lithium;
   the wall is structured such that any released energy from the ICF target assembly in the form of debris does not reach the pressure containment wall;
   a plurality of pipes surrounding the pressure containment wall, wherein the plurality of pipes have water, in a gaseous state, flowing through them; and
   an insulation wall surrounding the plurality of pipes.

2. A method of using an Inertial Confinement Fusion (ICF) chamber, the method comprising:
   receiving laser light within a target chamber;
   causing an ICF target assembly within the target chamber to receive x-ray radiation upon interaction of the laser light with the target assembly, wherein the target chamber comprises:
   a wall directly surrounding the target chamber comprising a plurality of holes
   the plurality of holes are positioned at a combination of different angles within the wall, penetrate through the wall, and radiate outward from the target chamber, wherein the plurality of holes are arranged throughout the wall such that there is a 1 to 1 ratio of holes to no-holes, and wherein the plurality of holes are filled with a low-Z material;

a pressure containment wall surrounding the wall, wherein the inner surface of the pressure containment wall is lined with an absorbing material, such as lithium;

the wall is structured such that any released energy from the ICF target assembly in the form of debris does not reach the pressure containment wall;

a plurality of pipes surrounding the pressure containment wall, wherein the plurality of pipes have water, in a gaseous state, flowing through them; and an insulation wall surrounding the plurality of pipes;

releasing energy in the form of radiation, debris and neutrons upon ignition of ICF target assembly.

\* \* \* \* \*